(12) United States Patent
Berzinji

(10) Patent No.: US 6,217,090 B1
(45) Date of Patent: Apr. 17, 2001

(54) SAFETY BUMPERS

(76) Inventor: Mohammed Berzinji, P.O. Box 1186, Los Molinas, CA (US) 96055

( * ) Notice: Subject to any disclaimer, the term of this patent is extended or adjusted under 35 U.S.C. 154(b) by 0 days.

(21) Appl. No.: 09/433,883

(22) Filed: Nov. 4, 1999

Related U.S. Application Data

(60) Provisional application No. 60/120,763, filed on Feb. 19, 1999.

(51) Int. Cl.$^7$ .......................... B60R 19/04; B60R 19/18; B60R 19/28
(52) U.S. Cl. .......................... 293/132; 293/132; 293/135; 293/136; 293/137; 293/106; 293/107
(58) Field of Search .................................. 293/106, 107, 293/124, 135, 136, 137, 132

(56) References Cited

U.S. PATENT DOCUMENTS

| | | | | |
|---|---|---|---|---|
| Re. 16,020 | * | 3/1925 | Schwartz .............................. | 293/137 |
| 846,599 | * | 3/1907 | Nicholson et al. .................. | 293/137 |
| 1,496,112 | * | 6/1924 | Banschbach ......................... | 293/135 |
| 2,094,739 | * | 10/1937 | Geiger .................................. | 293/137 |
| 2,142,328 | * | 1/1939 | Mutter .................................. | 293/137 |
| 2,466,265 | * | 4/1949 | Noonan ................................ | 293/137 |
| 2,792,250 | * | 5/1957 | Kingensmith et al. .............. | 293/137 |
| 3,313,567 | * | 4/1967 | Sturman ............................... | 293/137 |
| 3,433,520 | | 3/1969 | Kearns et al. . | |
| 3,708,194 | * | 1/1973 | Amit .................................... | 293/107 |
| 3,756,643 | * | 9/1973 | Weed ................................... | 293/137 |
| 3,833,248 | | 9/1974 | Wossner et al. . | |
| 3,834,483 | | 9/1974 | Palmer . | |
| 3,857,595 | | 12/1974 | Plegat . | |
| 3,960,397 | | 6/1976 | Janci . | |
| 3,961,669 | | 6/1976 | Kaneko . | |
| 4,025,098 | | 5/1977 | Powaska . | |
| 4,215,752 | | 8/1980 | Waller . | |
| 4,624,493 | | 11/1986 | Hillebrand et al. . | |
| 4,786,459 | | 11/1988 | Mundo . | |
| 4,807,915 | | 2/1989 | Shyi . | |
| 4,930,823 | | 6/1990 | Rivera . | |

FOREIGN PATENT DOCUMENTS

| | | |
|---|---|---|
| 211613 | 10/1960 | (AT) . |
| 2224646 | 3/1973 | (DE) . |
| 1385581 | 2/1975 | (GB) . |
| 500076 | 11/1954 | (IT) . |
| 670951 | 10/1964 | (IT) . |
| 1703518 | 1/1992 | (RU) . |

* cited by examiner

*Primary Examiner*—D. Glenn Dayoan
*Assistant Examiner*—Greg Blankenship
(74) *Attorney, Agent, or Firm*—Richard C. Litman

(57) ABSTRACT

A safety bumper system provides both impact protection for a vehicle and its occupants, and also provides fire protection for one or more areas of the vehicle after an impact sufficient to collapse the bumper. A first embodiment comprises a safety bumper assembly for the front and/or rear of a vehicle having a movable outer bumper shell, which is affixed to an inner plate with a relatively fixed bumper support member of the vehicle structure in between the outer bumper shell and inner plate, with compression springs urging the outer shell to an extended position away from the bumper support member, and tension springs urging the inner plate toward the bumper support member. A collapsible bladder is positioned between the outer bumper shell and the fixed bumper support portion, and contains a fire suppressant with a nozzle extending from the bladder to one or more critical areas of the vehicle, e.g., fuel tank and engine. A second embodiment provides a slight contact front bumper which incorporates a pair of push buttons between the bumper and a liner bumper for signaling the driver via a dashboard buzzer or light.

6 Claims, 5 Drawing Sheets

SAFETY BUMPERS

CROSS-REFERENCE TO RELATED APPLICATION

This application claims the benefit of U.S. Provisional Patent Application Ser. No. 60/120,763, filed Feb. 19, 1999.

BACKGROUND OF THE INVENTION

1. Field of the Invention

The present invention relates generally to automobile and motor vehicle safety equipment, and more specifically to a safety bumper system for absorbing impacts. A first embodiment of the present safety bumper also includes fire suppressant means therewith. While the bumper is particularly adapted for installation to the rear end of a motor vehicle, it may also be installed upon the forward end. A simplified front bumper with a contact signaling system is another embodiment.

2. Description of the Related Art

Increasing traffic congestion over the years has led to ever increasing numbers of collisions, both major and minor. The typical collision involves front-to-rear contact between two automobiles or other motor vehicles, due to following too closely in heavy traffic, inattentive driving on the part of the following driver, or for whatever other reason. Such collisions have become so frequent, that federally mandated standards have been implemented to require major automobile manufacturers to provide protection for critical components, e.g., lighting and signalling systems) in the event of a minor impact of a "five mile per hour bumper" regulation.

While the above noted regulation generally allows an automobile to be driven legally and safely after an accident until such time as repairs may be made, the fact remains that damage generally occurs to the bumper structure itself, with such bumper damage being relatively costly to repair. This is because the design of bumpers has been changed over the years in order to meet the Federal standards, and this has resulted in bumpers which serve well to protect other vehicle structures, but which may be damaged extensively and expensively themselves in a minor collision.

Furthermore, while federal standards provide protection for vehicle lighting systems and other critical components in relatively minor collisions, they do nothing to protect the structure in more major collisions involving higher closing speeds. Such accidents can seriously jeopardize various systems of the vehicle, with such system damage potentially endangering occupants of the vehicle in an otherwise relatively non-hazardous collision. A past example of such is the recall of the Ford Pinto automobile for additional protection of the fuel tank due to its vulnerability to damage from rear impacts. While in many cases such an impact did not directly endanger the occupants of the vehicle, the rupture of the fuel tank and resulting fire created further injury and even led to some deaths among vehicle occupants who had otherwise sustained only relatively minor, or perhaps no, injuries.

Accordingly, a need will be seen for a safety bumper incorporating spring means to absorb relatively minor impact forces without incurring damage to the bumper structure itself, or to other portions of the vehicle structure. The present safety bumper also incorporates a fire control system comprising a collapsible bladder disposed between the bumper and underlying relatively fixed bumper support structure of the vehicle. Impacts sufficient to collapse the bumper also serve to collapse the bladder, causing the bladder to eject a fire suppressant substance from a nozzle. The nozzle may be located in the vicinity of the vehicle fuel tank, or other critical area as desired.

Another aspect of a minor front collision with another automobile or wall is the difficulty of estimating the clearance by the driver because of the projecting front bumpers. Therefore, a second embodiment of the present invention utilizes a simplified and economical front bumper which will notify the driver by way of a dashboard signal such as a buzzer or warning light upon contact.

A discussion of the related art of which the present inventor is aware, and its differences and distinctions from the present invention, is provided below.

U.S. Pat. No. 3,433,520 issued on Mar. 18, 1969, to Norvan O. Kearns et al., titled "Spring Biased Shock Absorbing Bumper," describes a bumper mounted upon longitudinally disposed rods which are free to slide within relatively fixed brackets immovably affixed to the vehicle structure. Compression springs are disposed between the bumper and fixed structure. The Kearns et al. assembly differs from the present invention in that (1) the Kearns et al. springs are not concentric with their telescoping shafts; (2) Kearns et al. do not provide tension springs to provide a counterforce to assist in extending the bumper after impact; and (3) Kearns et al. do not provide any form of fire suppressant means, which feature including concentric springs and tension springs are in the present invention.

U.S. Pat. No. 3,833,248 issued on Sep. 3, 1974, to Felix Wossner et al., titled "Shock-Absorbing Bumper Arrangement," describes a shock absorber having constant resistance as the piston velocity decreases toward the end of its stroke. No bumper attachment or spring recovery means is disclosed in the Wossner et al. patent, nor is any fire suppressant means disclosed, as is provided in the present safety bumper invention.

U.S. Pat. No. 3,834,483 issued on Sep. 10, 1974 to J. F. Palmer, titled "Shock Absorbing Bumper System", describes a system incorporating both hydraulic or pneumatic telescoping shock absorbers and coil springs concentrically disposed therearound. The Palmer system also incorporates means for retracting and extending the bumpers as desired, and for automatically gearing down the vehicle upon impact, both of which systems are beyond the scope of the present invention. Palmer does not provide any tension springs for providing a counterforce to the compression of the bumper, as provided by the present system, nor does Palmer provide any fire suppressant means with his bumper.

U.S. Pat. No. 3,857,595 issued on Dec. 31, 1974, to Alain E. Plegat, titled "Shock-Absorber For Vehicles And The Like," describes a bumper system incorporating a series of crush washers (corrugated stampings, etc.) which are flattened upon impact to the bumper. The Plegat bumper utilizes a plurality of longitudinal rods upon which the washers are stacked, but does not provide any shock absorbing spring means, counterforce tension spring means, or fire suppressant means, all of which are parts of the present system.

U.S. Pat. No. 3,960,397 issued on Jun. 1, 1976, to John Janci, titled "Energy-Absorbing Bumper System," describes a system incorporating a gas-filled bumper shell in combination with a plurality of spring loaded telescoping bumper mounts. The springs are held in a compressed state until impact further momentarily compresses the struts, whereupon the springs are released to counteract the impact. The gas filled bumper also assists in absorbing impact, but the gas is not a fire suppressant substance, nor is it routed to any vital areas of the vehicle, as in the present system.

U.S. Pat. No. 3,961,669 issued on Jun. 8, 1976, to Mikio Kaneko describes an automobile fire fighting apparatus comprising an outer container containing a fire extinguishing composition and an inner container containing a high pressure gas with a plunger for activating the fire extinguishers upon impact. The fire extinguishers are to be located in the engine compartment and near the fuel tank. The apparatus is distinguishable for its location other than the bumpers.

U.S. Pat. No. 4,025,098 issued on May 24, 1977, to Tadeusz Powaska, titled "Bumper Assembly For A Motor Vehicle," describes a bumper system having two opposed lateral bumpers with telescoping struts and compression springs. No secondary counteracting tension springs are provided for restoring the original positions of the lateral bumpers, which restoring spring means is a part of the present rearward and/or forward bumper invention. Powaska also provides mutually interacting forward and rearward bumpers, with compression of one of the bumpers resulting in the retraction of the opposite bumper. The Powaska system requires a separate frame and body construction for the automobile with which it is used, which construction is not common in contemporary automobiles. The present system can be used with so-called "unibody" construction. Moreover, Powaska does not provide any fire suppressant means with his bumper system, which means is a part of the present bumper invention.

U.S. Pat. No. 4,215,752 issued on Aug. 5, 1980, to Gail J. Waller describes a vehicular fire suppressant system having a frangible fire extinguishant housing for passenger cars and fuel tanker trucks comprising an elongated cylindrical housing located near the rear axle of the car or on top of the truck's tank. The system is distinguishable for its critical location behind the car's rear axle in order to envelop the fuel tank with the fire extinguishing composition in a rear end collision.

U.S. Pat. No. 4,541,661 issued on Sep. 17, 1985, to Theodore L. Hawk, titled "Truck Bumper and Step Device," describes a pivotally mounted bumper assembly for attachment beneath the rear door of a truck body or the like. The Hawk bumper system includes a pair of shock absorbers and concentric springs extending from the lower portions of the bumper, forwardly and upwardly to secure to the underlying frame of the vehicle forwardly of the pivotal bumper attachment points. The device does not move linearly as in the present safety bumper, but rather pivots arcuately. Moreover, no fire suppressant means is disclosed by Hawk.

U.S. Pat. No. 4,624,493 issued on Nov. 25, 1986, to Donald G. Hillebrand et al., titled "Self-Restoring Energy Absorbing Bumper Mount," describes a bumper having a telescoping tube surrounded by a deformable plastic cylinder. The plastic cylinder is deformed upon bumper impact, and collapses in a predetermined manner within an outer shell. A precompressed spring is provided about the telescoping tube. However, the spring does nothing to absorb impact, as do the springs of the present safety bumper. Rather, the spring of the Hillebrand et al. bumper system serve only to extend the bumper to its original position after impact and the resulting collapse of the deformable plastic cylinder. Moreover, Hillebrand et al. do not provide any fire suppressant means, as provided in the present safety bumper invention.

U.S. Pat. No. 4,786,459 issued on Nov. 22, 1988, to James D. Mundo, titled "Vehicle Impact Energy Absorber," describes a system using a helically threaded post extending from some fixed portion of the vehicle structure with a rotatable friction member installed thereon. When an impact occurs, the friction member is forced to rotate about the threaded post as it is driven down the post. The energy used in driving the rotation assists in dissipating the impact energy. Mundo utilizes a compression spring to restore the bumper to its original position after impact, but does not provide any additional tension springs for this function, as provided in the present invention. Moreover, Mundo does not provide any fire suppressant means with his bumper, as provided in the present safety bumper invention.

U.S. Pat. No. 4,807,915 issued on Feb. 28, 1989, to David Y. Shyi, titled "Structure Of Multi-Protection Safety Car Bumper," describes an assembly including an outer bumper with a generally U-shaped form, with an additional structural member immovably affixed thereto. The bumper and structural member are movably secured to an immovable structural member of the vehicle by a series of compression springs and deformable plastic components. Shyi also provides means for retaining the extended ends of the U-shaped bumper adjacent the sides of the car in an impact, to preclude their spreading outwardly from the impact. Shyi neither provides a fixed intermediate plate sandwiched between two movable components, tension and compression springs, nor any fire suppressant means, each of which is a part of the present invention.

U.S. Pat. No. 4,930,823 issued on Jun. 5, 1990, to David Rivera, titled "Vehicle Bumper," describes a unitary bumper assembly having an integral telescoping spring assembly therein. An air bag or chamber is enclosed within the outer portion of the assembly, outwardly of the spring assembly. None of the components of the Rivera bumper assembly appear to attach to an immovably affixed component of the vehicle, as is the case with the present safety bumper invention. Moreover, the air bag of the Rivera bumper assembly does not provide any fire suppressant means upon activation, as does the fire suppressant bladder enclosed within the present bumper assembly.

Italian Patent Publication No. 500,076 published on Nov. 17, 1954, illustrates a relatively simple resilient bumper assembly, incorporating a plurality of compression springs disposed between a movable bumper shell and a fixed structure of the automobile. No additional movable plate is provided behind the fixed structure, nor is any fire suppressant means, both of which are provided in the present safety bumper invention.

Austrian Patent Publication No. 211,613 published on Oct. 25, 1960, illustrates a shock absorber operating by means of a ratchet principle. A rack and pinion gear mechanism drives a wheel when the rack or arm is pushed, which rotates a series of fingers against a ratchet tooth. No means is apparent for incorporating the device into an automobile bumper. Also, neither a telescoping tube, compression spring, tension spring, or fire suppressant means is apparent in the Austrian Patent Publication.

Italian Patent Publication No. 670,951 published on Oct. 15, 1964, illustrates a telescoping rod and concentric compression spring arrangement similar to that illustrated in the '076 Italian Patent Publication discussed above. No movable secondary plate for capturing a fixed structural member of the vehicle therebetween is disclosed, nor is any fire suppressant means apparent.

German Patent Publication No. 2,224,646 published on Mar. 15, 1973, illustrates a bumper assembly having compression springs therein. The assembly includes slotted friction plates, with the slots assisting in maintaining alignment of the bumper upon impact. No rearwardly disposed movable secondary member is apparent for sandwiching a fixed portion of the vehicle structure between the secondary member and bumper, as provided by the present bumper assembly, nor is any fire suppressant means apparent. This German Patent Publication is a result of a foreign filing based upon parent Japanese Patent Application No. 46-76, 758 to Nissan Motor Co., filed in Japan on Aug. 27, 1971.

British Patent Publication No. 1,385,581 published on Feb. 26, 1975, describes the same invention as that discussed above in the '646 German Patent Publication. The '581 British Patent Publication is also a result of the 46-76,758 Japanese Patent Application noted above, and the differences noted between that device and the present invention also apply here.

Russian Patent No. 1,703,518 issued on Jan. 7, 1992, to Vereshchagin S. B. describes a vehicle fuel tank combustion prevention system, wherein a reservoir containing a fire extinguishing fluid is positioned in the trunk compartment behind a non-flammable partition and not in the bumper system as in the present invention.

None of the above inventions and patents, either singly or in combination, is seen to describe the instant invention as claimed.

SUMMARY OF THE INVENTION

The present invention comprises a safety bumper for at least partially absorbing impacts between a motor vehicle so equipped, and other vehicles or objects. The present safety bumper basically comprises an outer bumper which is movable relative to the bulk of the vehicle structure, and a movable secondary or inner plate which is immovably affixed to the outer bumper. The outer bumper and secondary plate capture a relatively fixed bumper support component of the vehicle structure therebetween. A series of compression springs is installed between the outer bumper and the vehicle bumper support structure, with a series of tension springs provided between the vehicle structure and the movable secondary plate. The compression and tension springs work in concert to absorb impact forces and to return the bumper to its original position.

A bladder is installed between the outer bumper and the fixed bumper support portion of the vehicle structure, with the bladder including some form of fire suppressant material therein (chemical, inert gas, water, etc.). A nozzle extends from the bladder to some critical portion of the vehicle (e.g., fuel tank, engine compartment, etc.). If the bumper is hit with a relatively large impact, the bladder is compressed between the bumper and the underlying fixed bumper support structure, thus expelling the fire retardant material therein. While the present safety bumper is particularly well adapted for use on the rear of the vehicle, it will be seen that it is also adaptable for installation on the front of the vehicle as well, if so desired.

However, a front bumper system can be employed having a buzzer safety switch to minimize front end damage comprising a metal front bumper backed by a resilient layer and resilient attachment points to a metal liner bumper having a pair of push button switches to energize a dashboard buzzer or signal light of the contact.

Accordingly, it is a principal object of the invention to provide improved front and rear safety bumpers for absorbing at least some forces involved with the impact of an automobile collision.

It is another object of the invention to provide an improved rear safety bumper having a relatively movable outer bumper, an inner plate immovably affixed to the outer bumper, and a relatively fixed bumper support structure sandwiched therebetween.

It is a further object of the invention to provide an improved rear safety bumper incorporating compression springs between the outer bumper and vehicle bumper support structure, and tension springs between the vehicle structure and inner or secondary plate.

An additional object of the invention is to provide an improved rear safety bumper including fire suppressant means comprising a bladder containing fire suppressant material disposed between the outer bumper and fixed vehicle structure, whereby the bladder is deflated to expel the fire suppressant material when compressed between the outer bumper and bumper support structure on impact.

Still another object of the invention is to provide an improved front safety bumper having a resilient layer between the front bumper portion and a rear bumper portion having a pair of spaced push button switches for signaling contact to a dashboard buzzer or light.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a set of safety bumpers for installation on the conventional bumper support structure of a motor vehicle (automobile, light truck or pickup, van, etc.). A first embodiment of a front or rear safety bumper provides impact absorption and at least partially alleviates the forces involved with front and back end vehicle collisions, as well as providing automatic fire suppressant means in the event of such a collision. A second embodiment of a simplified front safety bumper is provided for signalling to the driver of a slight contact with an obstruction via a dashboard signal.

Figure 1:
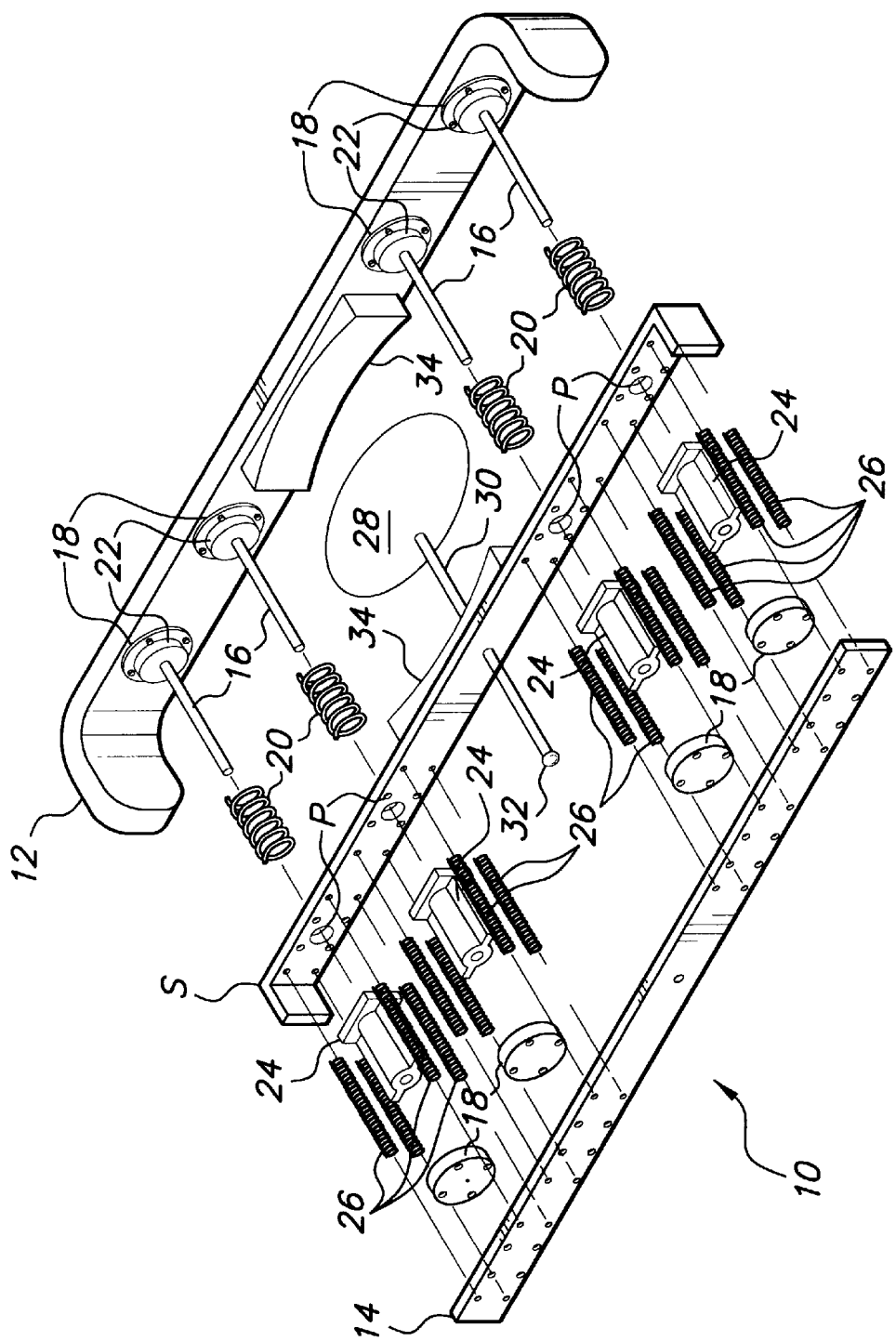
FIG. 1 is an exploded perspective view of a first embodiment of front and/or rear safety bumper apparatus, showing its various features and construction.

The various components of the present front/rear safety bumper 10 and their relationships are illustrated in the exploded perspective view of FIG. 1, as they would be installed about the conventional bumper support structural member S of a motor vehicle. The present safety bumper assembly 10 includes a rigid outer bumper shell 12 formed of stamped steel or other suitable material (a plastic overlay may be provided for appearance, if so desired), which is joined to an inner secondary bumper plate 14 by means of a series of rigid, elongate bumper connecting rods or tubes 16. The connecting rods or tubes 16 are rigidly and immovably affixed to the outer bumper shell 12 by means of corresponding attachment plates 18, which may be bolted, welded, or otherwise rigidly and immovably affixed to the inner surface of the bumper shell 12. The opposite ends of the rods or tubes 16 are rigidly and immovably affixed to the inner secondary bumper plate 14, by a corresponding number of similar attachment plates 18. Thus, the outer bumper shell 12 and inner secondary bumper plate 14 are rigidly and immovably affixed to one another by the rods or tubes 16, and move in concert with one another in the event of an impact to the outer bumper shell 12.

The bumper component connecting rods 16 extend through a series of passages P, formed through the bumper support structure S of the vehicle, with the bumper support structure S thus being captured between the outer bumper shell 12 and the inner secondary bumper plate 14. A compression spring 20 is disposed concentrically about each of the connector rods or tubes 16, between the outer bumper shell 12 and the vehicle bumper support structure S, and serve to hold the outer bumper shell 12 in a normally outwardly extended position, for absorbing any impact forces which may occur. Some slight additional cushioning may be provided by a rubber or elastomer spring seat 22, disposed over each of the rod attachment plates 18 at their attachment to the outer bumper shell 12. It is noted that while no additional spring seats are shown between the opposite ends of the coil springs 20 and the vehicle bumper support structure S, that such spring seats may be provided at those locations, if so desired.

Each of the rods or tubes 16 passes through a guide member 24, which serves as a linear bearing means for maintaining the longitudinal alignment of each of the rods 16 as they are pushed through the vehicle bumper attachment or support structure S in the event of an impact to the outer bumper shell 12. The linear bearing guide members 24 are each secured to the inner face of the vehicle bumper support structural member S, concentrically about the bumper connector rod clearance passages P formed therethrough. The guide members 24 serve to preclude any lateral, vertical, or diagonal movement of the outer bumper shell 12 and inner secondary bumper plate 14 relative to the vehicle bumper support structure S in the event of a collision which forces the outer bumper shell 12 inwardly toward the bumper support structure S.

A plurality of tension springs 26 extends between the vehicle bumper support structure S and the inner secondary bumper plate 14, connecting the two components S and 14 together. It will be seen that the tension springs 26 tend to withstand the force moving the two components S and 14 toward one another, thus imparting an outwardly extending force to the connector rods 16 and thence to the outer bumper shell 12, in the manner of the compression springs 20 on the opposite side of the vehicle bumper support structure S. Thus, the tension springs 26 and the compression springs 20 work in concert to urge the outer bumper shell 12 to a normally outwardly extended position, and further provide a positional restoring force in the event the outer bumper shell 12 is pushed inwardly toward the vehicle bumper support structure S by an impact.

The space between the outer bumper shell 12 and the bumper support member S of the vehicle body or frame structure, includes a collapsible bladder 28 disposed inbetween. The bladder 28 may be filled with air or other gas to provide additional cushioning, or may contain a fire suppressant material (nitrogen or other inert gas, fire suppressant chemicals such as dry chemical or Halon (TM), etc.). A fire suppressant delivery line 30 extends from the bladder 28 to one or more critical areas of the vehicle (e.g., fuel tank, engine compartment, etc.). A pressure relief valve or nozzle 32 may be provided at some point in the bladder and tube system, with the valve 32 opening at some predetermined pressure to release the contents of the bladder 28. The pressure developed in the bladder 28 will be seen to be directly proportional to the amount of collapse of the outer bumper shell 12 toward the vehicle bumper support structure S, and is thus dependent upon any impact force developed in a collision. The bladder 28 may be protected from damage or abrasion by a pair of opposed protective cushioning elements 34 installed in rear face of the bumper shell 12 and the front face of the bumper support structure S, to each side of the bladder 28.

Figure 2:
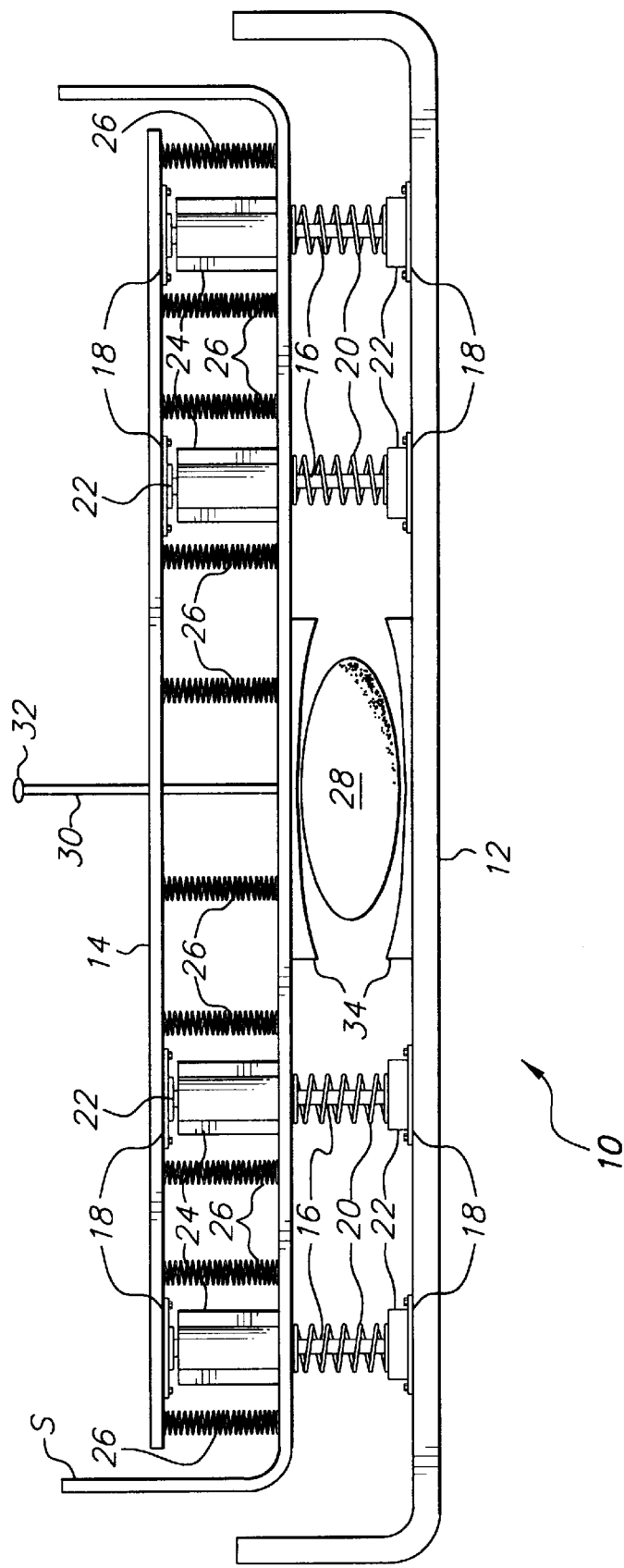
FIG. 2 is a top plan view in section of the FIG. 1 safety bumper in a normal, uncollapsed state, showing its configuration.

FIG. 2 illustrates the assembled safety bumper 10 of the present invention in its normal state, with the outer bumper shell 12 extended away from the vehicle bumper support structure S by means of the compression springs 20 and tension springs 26. In this condition, there is a sufficient volume between the outer bumper shell 12 and the bumper support structure S of the vehicle, for the distended and filled bladder 28. While the bladder 28 is pressurized with the selected fire suppressant material, the pressure is insufficient to trigger the pressure relief valve 32 to release the material.

Figure 3:
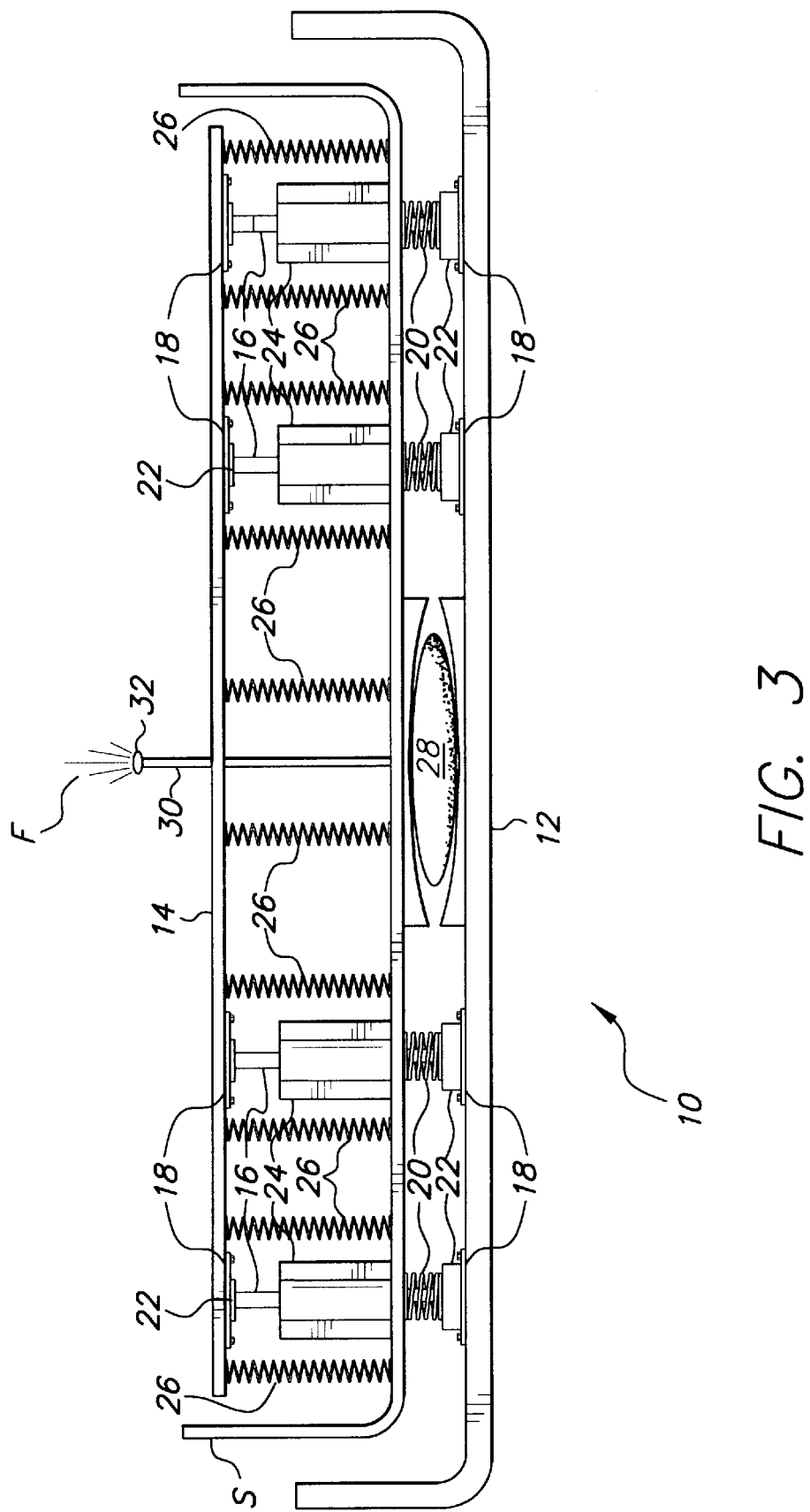
FIG. 3 is a top plan view in section of the safety bumper of FIG. 2, but showing its condition after an impact which has collapsed the outer bumper inwardly.

FIG. 3 illustrates the condition of the present safety bumper 12 after a reasonably hard impact. The bumper shell 12 has been struck with sufficient force to collapse the compression springs 20 and extend the tension springs 26, driving the bumper shell 12 inwardly toward the vehicle bumper support structure S. This reduces the space between the bumper shell 12 and the underlying bumper support structure S of the vehicle, thereby compressing the collapsible bladder 28 inbetween. The compressive force on the bladder 28 increases the pressure within the bladder to the point that the pressure relief valve 32 is triggered, thereby releasing the fire suppressant materials F contained within the bladder 28, to escape from the nozzle 32 to suppress any fire or potential fire which might have resulted from the impact.

Figure 4:
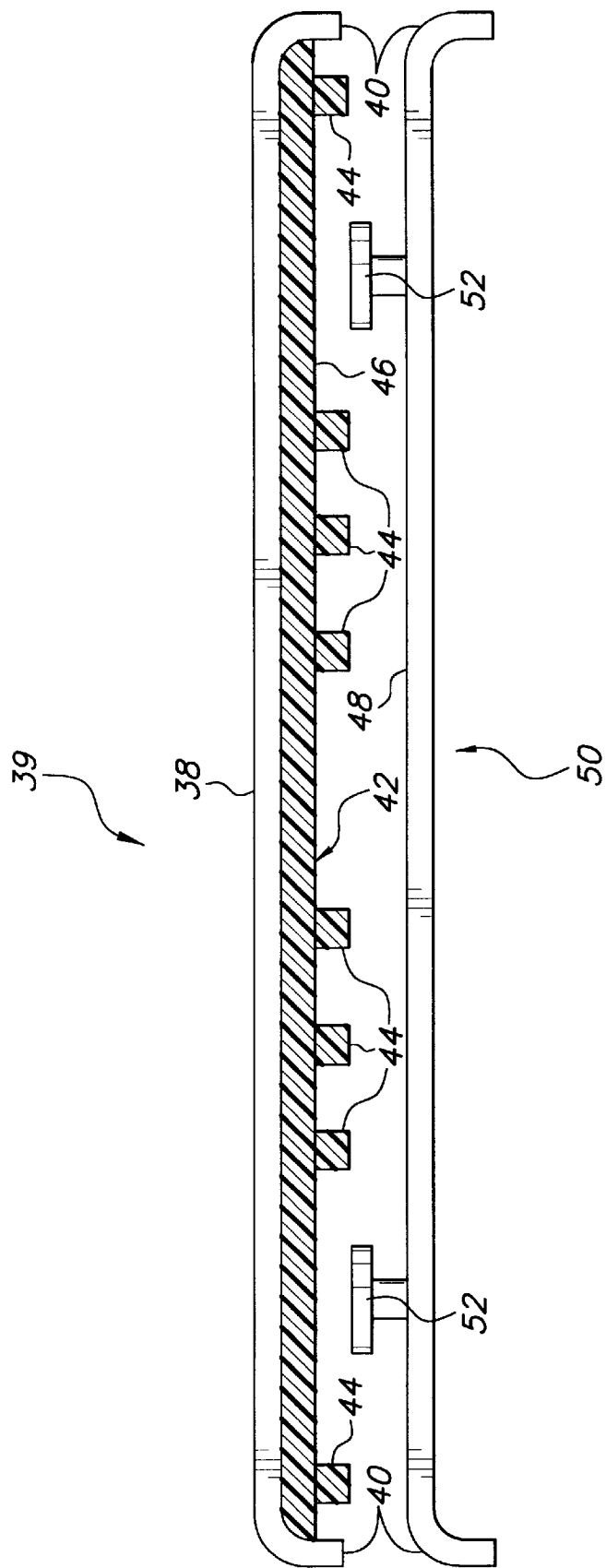
FIG. 4 is a top plan view of a second embodiment of a front safety bumper having a pair of contact switches on a liner bumper.
Figure 5:
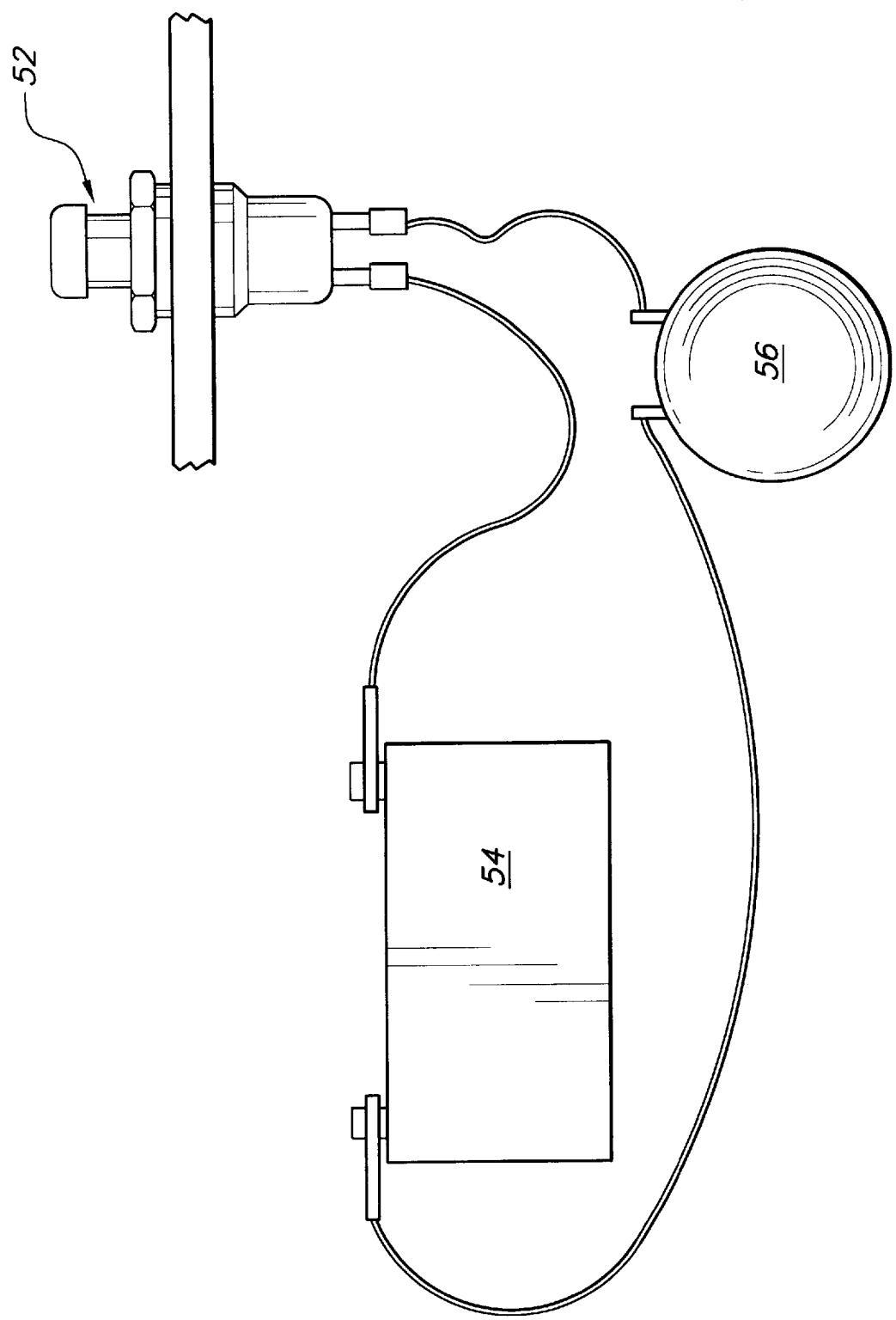
FIG. 5 is a schematic diagram of a push button switch on the liner bumper of FIG. 4 in an electrical circuit with the car battery and dashboard buzzer of light.

As mentioned above, the safety bumper 10 can be employed in the front and rear, but preferably in the rear with the front safety bumper system 36 of FIG. 4 employed with a relatively more sensitive contact signalling system involved. A metal front bumper 38 with curved ends 40 has a resilient strip 42, preferably rubber, and attachment pads 44, preferably rubber, on its rear face 46 for attachment by bolts (not shown) either inserted from the front bumper 38 or from the rear face 48 of the bumper liner 50. The bumper liner 50 has curved ends 40 and a pair of push button switches 52 which are connected electrically to the car battery 54 and a dashboard mounted buzzer or signal light 56 as depicted in FIG. 5. Thus, a light front bumper contact would signal to the driver that contact with another car or obstruction has been made for prevention of further forward slow movement. This embodiment is valuable in parking when even a slight contact can cause damage to another vehicle. Of course, this embodiment can be incorporated in the rear bumper system of FIGS. 1–3.

In summary, the present safety bumper provides an advance in the protection of both vehicle structures and occupants in the event of an accident. The present rear/front safety bumper not only cushions the impact forces of a collision against the bumper by means of the compression and tension springs acting in concert, but also serves to extinguish any fire resulting from the impact forces, if such forces are sufficient to trigger the fire safety system of the present bumper. The collapsible bladder of the fire safety system provides another advantage, in that it also provides further cushioning of impact forces in the event of a collision against the bumper. Yet, the forces involved in minor collisions are not sufficient to pressurize the bladder to the extent required to release the fire suppressant materials therein, thus precluding any requirement to recharge the system after a minor impact.

The present front/rear safety bumper is particularly well suited for installation to the rear of a conventional motor vehicle, where the fire suppressant delivery line may be routed to the vicinity of the fuel tank. However, it will be seen that the present safety bumper may also be installed on the front of a vehicle, with the fire suppressant system directing fire suppressant materials to the engine compartment or other area as desired. However, a more simplified and economical front safety bumper has been disclosed which will prevent minor but expensive collisions when parking and the like. Thus, the present safety bumper system provides a broad range of protection for a motor vehicle which might be involved in a front or rear collision.

It is to be understood that the present invention is not limited to the sole embodiment described above, but encompasses any and all embodiments within the scope of the following claims.

I claim:

1. A safety bumper system for installation on a motor vehicle having a bumper support structure comprising:

a rigid outer bumper shell;

a rigid inner bumper plate;

said bumper shell and said bumper plate being rigidly and immovably connected to one another by a plurality of rigid elongate bumper connecting rods immovably affixed to said bumper shell and to said bumper plate and extending therebetween for spacing said bumper shell and said bumper plate from one another;

said bumper shell and said bumper plate capturing the bumper support structure of the vehicle therebetween;

a plurality of compression springs, with one of said springs disposed concentrically about each of said connecting rods between said bumper shell and the vehicle bumper support structure, for urging said bumper shell outwardly from the vehicle bumper support structure and for absorbing impact energy in a collision with said bumper shell; and a plurality of tension springs disposed between the vehicle bumper support structure and said bumper plate, for urging said bumper plate toward the vehicle bumper support structure and for absorbing impact energy in the collision with said bumper shell.

2. The safety bumper system according to claim 1, including a linear bearing guide for each connecting rod positioned between the vehicle support structure and the inner bumper plate.

3. The safety bumper system according to claim 2, including a bumper rod attachment plate for each connecting rod on the inner bumper plate.

4. The safety bumper system according to claim 1, including a collapsible bladder disposed between said bumper shell and the vehicle support structure; and said bladder including a fire suppressant substance therein, and a fire suppressant delivery line extending therefrom for automatically delivering said fire suppressant substance to at least one other area of the vehicle in the collision causing compression of said bumper shell toward the vehicle bumper support structure.

5. The safety bumper system according to claim 4, including a protective cushioning element with a concave surface disposed on a rear face of the outer bumper shell and on a front face of the vehicle bumper support structure for supporting the bladder.

6. The safety bumper system according to claim 5, including a pair of push button switches on the front face of the motor vehicle support structure for signaling contact of the outer bumper shell with at least one of the push button switches.

* * * * *